United States Patent
Asai et al.

(10) Patent No.: US 8,458,409 B2
(45) Date of Patent: Jun. 4, 2013

(54) ACCESS CONTROLLER

(75) Inventors: Koji Asai, Hyogo (JP); Takashi Morimoto, Osaka (JP); Ryuta Nakanishi, Osaka (JP)

(73) Assignee: Panasonic Corporation, Osaka (JP)

( * ) Notice: Subject to any disclaimer, the term of this patent is extended or adjusted under 35 U.S.C. 154(b) by 881 days.

(21) Appl. No.: 12/598,478

(22) PCT Filed: Mar. 2, 2009

(86) PCT No.: PCT/JP2009/000925
§ 371 (c)(1),
(2), (4) Date: Nov. 2, 2009

(87) PCT Pub. No.: WO2009/119009
PCT Pub. Date: Oct. 1, 2009

(65) Prior Publication Data
US 2010/0122040 A1 May 13, 2010

(30) Foreign Application Priority Data
Mar. 27, 2008 (JP) .................................. 2008-082790

(51) Int. Cl.
G06F 12/00 (2006.01)
(52) U.S. Cl.
USPC ............................ 711/147; 711/154; 711/170
(58) Field of Classification Search
USPC ......................................... 711/147, 154, 170
See application file for complete search history.

(56) References Cited

U.S. PATENT DOCUMENTS
2008/0215782 A1  9/2008  Mochida et al.

FOREIGN PATENT DOCUMENTS

| EP | 1 909 183 | 4/2008 |
|----|-----------|--------|
| JP | 2005-197141 | 7/2005 |
| JP | 2007-207024 | 8/2007 |
| JP | 2007-213225 | 8/2007 |
| JP | 2008-27245 | 2/2008 |
| WO | 2006/001245 | 1/2006 |
| WO | 2007/004696 | 1/2007 |

OTHER PUBLICATIONS

International Search Report issued Jun. 2, 2009 in International (PCT) Application No. PCT/JP2009/000925.

*Primary Examiner* — Matthew Bradley
(74) *Attorney, Agent, or Firm* — Wenderoth, Lind & Ponack, L.L.P.

(57) ABSTRACT

An access control apparatus receives access requests from one or more regular masters and an irregular master and sequentially selects an access allowable target. Additionally, the access control apparatus calculates an amount of unused resources based on an amount of resources used by a regular master and a maximum amount of resources to be used by the regular master, and manages the unused resources. The access control apparatus selects an access request of an irregular master as an access allowable target when the irregular master makes the access request during a unit period and access based on an access request of at least one of the regular masters that has not been executed. The managed amount of unused resources is equal to or larger than an amount of resources which is to be used based on the access request of the irregular master.

12 Claims, 13 Drawing Sheets

FIG. 2

Data structure of access request

| Access type (Read:01b Write:00b) | Requester type (master A:001b, master B:010b master C:011b, processor D:100b processor E:101b) | Start address (4 bytes) | Access area (4 bytes) |
|---|---|---|---|

Access control information table

| | | |
|---|---|---|
| Unit period (the number of clocks) | | 100 |
| Maximum amount of resources to be used (the number of clocks) | Master A | 30 |
| | Master B | 30 |
| | Master C | 40 |

ACCESS CONTROLLER

BACKGROUND OF THE INVENTION

1. Technical Field

The present invention relates to an access control apparatus for executing access control when a plurality of masters access a shared memory, and especially to a technology to improve responsiveness to an access request of a master which irregularly makes the access request.

2. Background Art

There is a system in which a memory is shared by a master which needs to access the memory at a constant rate during a predetermined period (hereinafter, referred to as a "real time master" or simply a "master"), and a master which irregularly makes an access request for the memory and hence the occurrence of the access request is difficult to predict (hereinafter, referred to as a "processor").

Such a system usually includes a circuit for arbitrating between the real time master and the processor in order to prevent a memory access contention therebetween.

Generally, a system will fail unless the real time master makes an access request at a constant rate during a predetermined period. For example, in a system like a television, problems like dropping frames and display of the previous frame can occur.

On the contrary, the system will not fail even if it lacks responsiveness to a processor access. But, for example, in a television system, drawing and display delay of an EPG (Electronic Program Guide) and a data broadcast occurs, and this can cause users using the system to be stressed.

Therefore, efforts to improve responsiveness to the processor access are often made, while giving priority to an access from the real time master usually.

For example, Patent Document 1 discloses a technology to improve responsiveness to an access request of a processor in this kind of system.

According to the Patent Document 1, in the case where the real time master obtains a constant rate, and memory access requests of other masters are not targets of arbitration (the case where there are extra resources with respect to the access to a shared memory), an access from the real time master at a rate equal to or higher than the constant rate is allowed. This causes the real time master to access the shared memory more excessively than originally expected, which means that a margin is created with respect to the access which should be executed periodically. Accordingly, when a processor makes an access request, it is possible to allow the processor to access a shared memory using rates which was originally allocated to the real time master. Such a technology to improve responsiveness to a processor access in the situation where there is a margin, that is, the real time master executes an access at a rate equal to or higher than a constant rate is disclosed.

Patent Document 1: PCT International Publication No. WO 07/004,696 pamphlet

SUMMARY OF THE INVENTION

However, in the technology disclosed in the Patent Document 1, the real time master has to preliminarily execute an access to the memory, which is a shared resource, at a rate equal to or higher than a constant rate in a situation where there are extra resources. The situation where there are extra resources is a situation where there is no memory access request of a processor and where a real time master has already obtained a band equivalent to a required rate, or there is no access request of the other real time masters. Therefore, in a system in which a real time master cannot preliminarily execute an access, or in a high intensity system in which a real time master uses most of the shared resources and there is little extra memory resource, it is impossible to create the situation where the real time master executes an access at a rate equal to or higher than a constant rate. When an access request of the processor occurs as a result of this, the situation where there are extra resources can not be ensured. Therefore, it is necessary to wait until an access from the real time master does not occur, that is, until extra resources occur. This disturbs improving the responsiveness.

The present invention was conceived in view of the above problem, and aims to provide an access control apparatus which can improve responsiveness to an access request of a processor in comparison with a conventional technology.

In order to achieve the above mentioned object, the present invention provides an access control apparatus that receives access requests from (i) one or more regular masters to which a maximum amount of resources used for accessing a memory during a unit period is preliminarily given and (ii) an irregular master which irregularly accesses the memory, and sequentially selects an access allowable target, the access control apparatus comprising: a management unit operable to manage an amount of unused resources which is obtained by subtracting an amount of used resources from the maximum amount of resources, the amount of used resources being used by a regular master making an access request during the unit period, the maximum amount of resources being given to the regular master, and a selection unit operable to select an access request of the irregular master as an access allowable target when (i) the irregular master makes the access request during the unit period and an access based on the access request of at least one of the regular masters has not been executed, and (ii) a total of the amount of unused resources that are managed by the management unit is equal to or larger than an amount of resources which is to be used based on the access request of the irregular master.

With the above-stated structure, the access control apparatus can preferentially select the access request of the irregular master when the irregular master makes the access request and the access based on the access request of at least one of the regular masters has not been executed, and when the total of the amount of unused resources is equal to or larger than the amount of resources which is to be used based on the access request of the irregular master. Accordingly, responsiveness to an access request of the irregular master can be improved compared with a conventional technology, because there is no need for creating a conventional situation where a regular master has executed an access at a rate equal to or higher than a constant rate.

In the above-stated access control apparatus, the amount of used resources may be an amount of resources which has been used from a start till an end of an access execution, and the management unit identifies the amount of used resources by measuring an amount of resources which has been used from a start till an end of an access execution requested by the regular master being an access allowable target, the amount of used resources being used for calculating the amount of unused resources.

With this structure, as the access control apparatus measures the amount of used resources which has been used from the start till the end of the access execution requested by the regular master, it can calculate the accurate amount of unused resources by using the amount of used resources.

In the above-stated access control apparatus, the management unit may store a total of the calculated amount of unused resources, and, when an access allowable target is an irregular master, (i) measure an amount of used resources which has been used for executing an access requested by the irregular master, (ii) calculate a new total by subtracting the measured amount of used resources from the total, and (iii) update the total to the new total.

With this structure, as the access control apparatus stores the new total after executing the access requested by the irregular master, when a new access request is additionally made by the irregular master during the same unit period, it can select whether or not it should allow the new access request to be the access allowable target by using the new total.

In the above-stated access control apparatus, when the total is not equal to or larger than the amount of resources to be used, the selection unit may judge (i) whether or not accesses to the memory requested by all the regular masters should be executed during the following unit period and (ii) whether or not an amount of remaining resources based on a current remaining amount of time in the unit period is equal to or larger than the amount of resources to be used, and when both judgments are affirmative, select the access request of the irregular master as an access allowable target.

With this structure, even if the total of the amount of unused resources is not equal to or larger than the amount of resources which is to be used based on the access request, the access control apparatus can allows the access request of the irregular master to be the access allowable target in the case where accesses to the memory requested by all the regular masters are executed during the following unit period, and the amount of remaining resources is equal to or larger than the amount of resources to be used. Accordingly, also in such a situation, responsiveness to an access request of the irregular master can be improved compared with the conventional technology because there is no need for creating a conventional situation where regular masters have executed an access at a rate equal to or higher than a constant rate.

In the above-stated access control apparatus, the management unit may store a total of the calculated amount of unused resources, and reset the total stored at the time to a predetermined value when the unit period has elapsed.

With this structure, the access control apparatus does not carry the total of the calculated amount of unused resources managed at the time over the following unit period, because it resets the total of the amount of unused resources to the predetermined value after the elapse of the unit period. Therefore, an access requested by each of the regular masters does not fail, because the access requested by each regular master is guaranteed to be executed during the following unit period within the maximum amount of resources preliminarily given.

In the above-stated access control apparatus, the maximum amount of resources given to the regular master may be a maximum amount of time allowed for the regular master to use for executing an access to the memory, the amount of used resources is an amount of time which has been used for executing an access to the memory requested by the regular master, the amount of resources to be used is an amount of time which is to be used for executing an access to the memory requested by the irregular master, and the management unit calculates, as an amount of unused access, an unexecuted amount of time which is obtained by subtracting the amount of time which has been used for executing an access requested by the regular master from the maximum amount of time given to the regular master being a target of an access execution.

With this structure, the access control apparatus can improve responsiveness to the access request of the irregular master compared with a conventional technology by using an amount of resources employing a time.

In the above-stated access control apparatus, the amount of used resources may be an amount of resources which is to be used for executing an access to the memory, and the management unit identifies the amount of used resources by calculating an amount of resources which is to be used for executing an access to the memory requested by a regular master making an access request to be processed during the unit period, the amount of used resources being used for calculating the amount of unused resources.

With this structure, at the time the regular master makes the access request, the access control apparatus calculates the amount of resources which is to be used based on the access request and calculates the amount of unused resources using the calculated amount of resources to be used. This enables the access control apparatus to allow the access request of the irregular master to be the access allowable target based on the calculated amount of unused resources before executing the access requested by the regular master. Therefore, the access control apparatus can improve responsiveness to the access request of the irregular master compared with the conventional technology.

In the above-stated access control apparatus, the access request may include specifying information for specifying a size of a memory area from which data is read or a size of a memory area to which data is written, and the management unit calculates the amount of resources which is to be used for executing an access to the memory requested by the regular master making the access request to be processed during the unit period, based on the size of the memory area specified by the specifying information included in the access request of the regular master.

With this structure, the access control apparatus can calculate the amount of resources which is to be used based on the access request of the regular master by using the specifying information included in the access request.

BRIEF DESCRIPTION OF THE DRAWING

FIG. 2 shows an example of the data structure of an access request.

FIG. 3 shows an example of the data structure of an access control information table 300.

Figure 1:
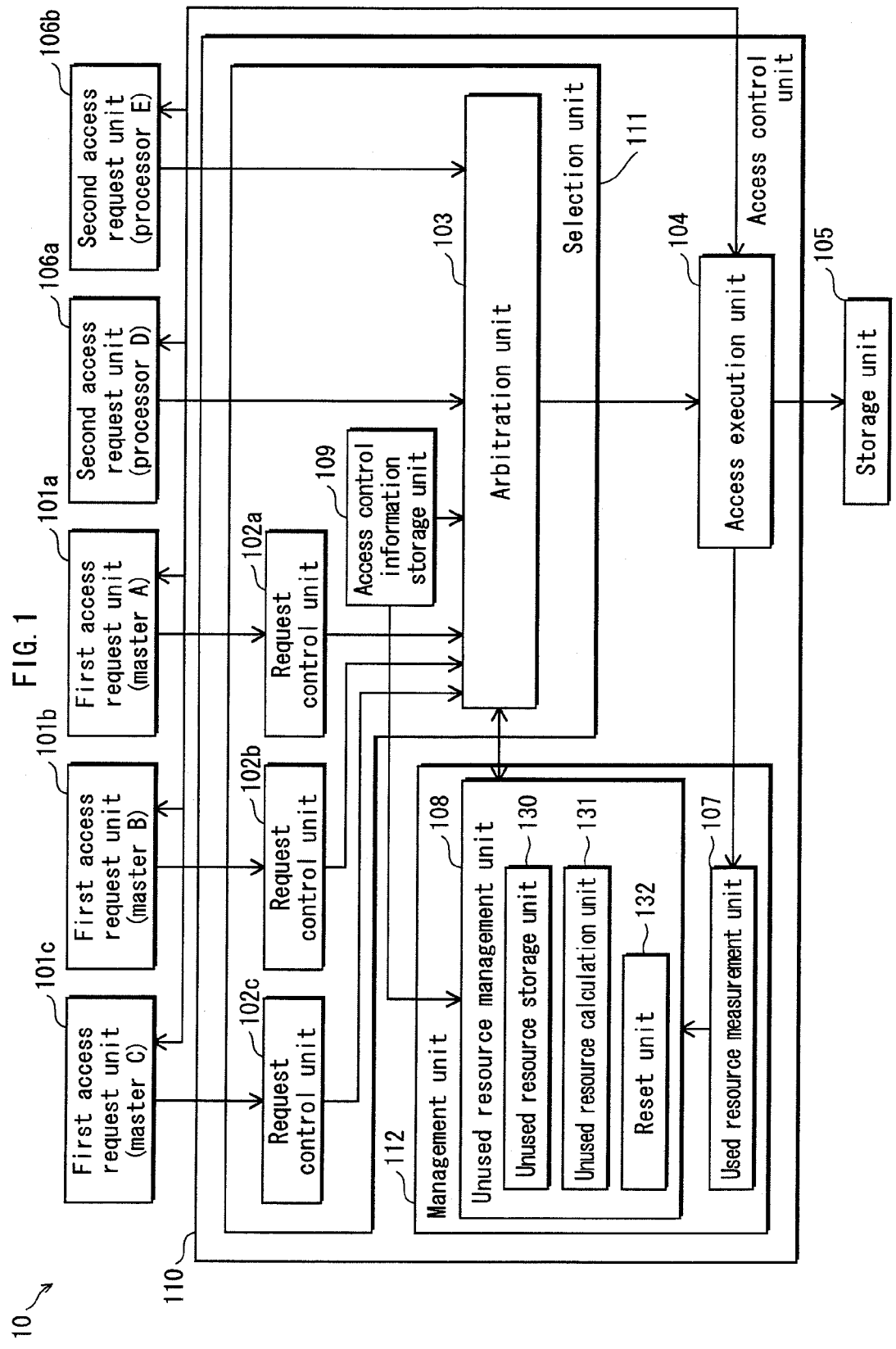
FIG. 1 is a block diagram showing the structure of an access control apparatus 10.

DESCRIPTION OF CHARACTERS 10 access control apparatus
101a, 101b, 101c first access request unit
102a, 102b, 102c request control unit
103 arbitration unit
104 access execution unit
105 storage unit
106a, 106b second access request unit
107 used resource measurement unit
108 unused resource management unit
109 access control information storage unit
110 access control unit
111 selection unit
112 management unit
130 unused resource storage unit
131 unused resource calculation unit
132 reset unit

DETAILED DESCRIPTION OF THE INVENTION

1. Embodiment 1

In the following, embodiment 1 of the present invention is described with reference to the attached drawings.

1.1 Structure of an Access Control Apparatus 10

FIG. 1 is a block diagram showing the structure of an access control apparatus 10 in embodiment 1 of the present invention.

As shown in FIG. 1, the access control apparatus 10 is composed of first access request units 101a, 101b and 101c (hereinafter, they are also referred to as "masters A, B and C" respectively), second access request units 106a and 106b, an access control unit 110 and a storage unit 105.

(1) Storage Unit 105

The storage unit 105 is a memory to be accessed by the first access request units 101a, 101b and 101c and the second access request units 106a and 106b. It has an area for storing data processed by these access request units.

(2) First Access Request Units 101a, 101b and 101c

The first access request units 101a, 101b and 101c are real time masters. Each of the first access request units 101a, 101b and 101c is expected to access the storage unit 105 during a unit period (in this example, 100 clocks) as one cycle, and a maximum amount of resources which is to be used by each of the accesses is preliminarily given. Meanwhile, the amount of resources in this embodiment means an amount of time (the number of clocks). And also, once an access to the storage unit 105 starts, each of the first access request units 101a, 101b and 101c does not stop processing relating to the access in midstream.

(3) Second Access Request Units 106a and 106b

The second access request units 106a and 106b are processors each of which irregularly accesses the storage unit 105. Hereinafter, the second access request units 106a and 106b are also referred to as processors D and E respectively.

(4) Access Control Unit 110

The access control unit 110 controls, during a unit period, accesses executed upon request for access from the first access request units 101a, 101b and 101c and accesses executed upon request for access from the second access request units 106a and 106b which irregularly occurs during the unit period. As shown in FIG. 1, it includes a selection unit 111, a management unit 112 and an access execution unit 104.

(4-1) Data Structure of an Access Request

Here, one example of the data structure of an access request is shown in FIG. 2. As shown in FIG. 2, the access request is composed of an access type 201, a requester type 202, a start address 203 and an access area 204.

The access type 201 identifies whether the access request is a request for reading data or a request for writing data. For example, a value "01b" indicates that it is a request for reading, and a value "00b" indicates that it is a request for writing.

The requester type 202 identifies a requester of the access request. For example, a value "001b" indicates that the requester is the master A, and a value "100b" indicates that the requester is the processor D.

The start address 203 indicates a start position (address) of reading from the storage unit 105 or writing to the storage unit 105.

The access area 204 indicates an area (size) for reading data or an area required for writing data in which the start position is indicated by the start address 203.

(4-2) Selection Unit 111

A selection unit 111 selects an access request of each access request unit targeted for an access which is executed upon the access request from each access request unit. As shown in FIG. 1, it includes request control units 102a, 102b and 102c, an arbitration unit 103 and an access control information storage unit 109.

(Access Control Information Storage Unit 109)

An access control information storage unit 109 is a memory area including an access control information table 300 shown in FIG. 3. The access control information table 300 is composed of a unit period 301 and a maximum amount of resources to be used 302. The unit period 301 is information indicating a cycle in which accesses requested by the masters A-C are expected, and the maximum amount of resources to be used 302 is information indicating maximum amounts of resources to be used which are given to the masters A, B and C respectively during the unit period.

For example, according to FIG. 3, the maximum amounts of resources to be used "30", "30" and "40" are given to the masters A, B and C respectively.

Meanwhile, in this embodiment, accesses requested by the masters A, B and C, to each of which the maximum amount of resources to be used shown in FIG. 3 is given, are executed in this order during the unit period.

(Request Control Units 102a, 102b and 102c)

Each of the request control units 102a, 102b and 102c takes control such that constant rates are ensured for each of the access request of the corresponding access request units 101a, 101b and 101c during a unit period. Each of the request control units includes a rate control counter (not illustrated) for taking control by counting down so that the constant rates can be ensured. Here, each of the rate control counters included in each of the request control units 102a, 102b and 102c has a value "100" at the start of an operation. Here also, each of the rate control counters counts down the number of clocks regardless of whether an access request occurs or not.

Each of the request control units 102a-102c has a judgment value to judge whether or not an access request of the corresponding master occurs during a unit period. Each of the request control units 102a-102c adds the predetermined value "100", which is same as a value of a unit period indicated in the access control information table 300, to a value of the rate control counter when the value of the rate control counter falls below the judgment value.

Meanwhile, in this embodiment, the judgment values which the request control units 102a, 102b and 102c have are values "100", "70" and "40" respectively. Even if accesses requested by the masters A, B and C are assumed to be executed in this order during a unit period, actually, there is a master which does not make an access request during the unit period. For example, when, by the time a value of the rate control counter included in the request control unit 102b falls below the value "70", an access request of the corresponding master B has not occurred, there is a possibility that the following processing or an access requested by the master C will not end within the unit period. It causes failure of processing executed by the access control apparatus. Therefore, when, by the time a value of the rate control counter falls below the judgment value during the unit period, an access request of the corresponding master has not occurred, each of the request control units shows that it is waiting for an access request in the following unit period by adding a value "100" to the value of the rate control counter.

Also, each of the request control units 102a-102c adds the predetermined value "100" to the value of its rate control counter when an access request of the corresponding master is selected as an access allowable target.

(Arbitration Unit 103)

An arbitration unit 103 arbitrates between access requests of the first access request units 101a, 101b and 101c controlled by the first request control units 102a, 102b and 102c, and access requests of the access request units 106a and 106b, in other words, it selects an access allowable target.

Upon receiving an access request from the first request control units 102a, 102b and 102c, and the second access request units 106a and 106b, the arbitration unit 103 judges whether the access request is that of the masters or that of the processors by a requester type included in the received access request.

The arbitration unit 103 determines whether it selects the received access request as the access allowable target.

The selecting method is described in the following specific example.

When a requester of the access request which is selected as the access allowable target is a master, the arbitration unit 103 obtains the maximum amount of resources to be used which is given to the master from the access control information table 300 included in the access control information storage unit 109, and gives the obtained maximum amount of resources to be used as a amount of time used to execute the access requested by the processor.

When a requester of the access request which is selected as the access allowable target is a processor, the arbitration unit 103 gives an amount of resources which is to be used by the processor (hereinafter, referred to as an "amount of resources to be used") as an amount of time used to execute the access requested by the processor.

The following describes the arbitration unit 103 with use of a specific example.

Upon receiving an access request from the first access request unit 101a, the arbitration unit 103 judges whether or not a value of the rate control counter included in the corresponding request control unit 102a is equal to or lower than a threshold value (in this example, a value "100"). When judging that it is equal to or lower than the threshold value, the arbitration unit 103 further judges whether or not it has a higher priority than the other masters (in this example, the first request control units 102b and 102c). Specifically, it judges that the master A has a higher priority than the other masters, when the value shown by the rate control counter corresponding to the master A (the first access request unit 101a) is lower than any other values shown by the rate control counters corresponding to the masters B and C.

When the master A has a higher priority than the masters B and C, the arbitration unit 103 selects the access request of the master A as the access allowable target, and gives a corresponding maximum amount of resources to be used to the selected access request.

At this time, the request control unit 102a adds a predetermined value "100" to the value of its rate control counter as described above, because the access request of the master A is selected. This causes the master A to have a lower priority than the masters B and C. Accordingly, even if another access request of the master A occurs during a unit period, that is, even if another access request which is expected to occur during the following unit period occurs, an access for the access request is not executed during the unit period.

Upon receiving an access request from the second access request unit 106a, the arbitration unit 103 calculates an amount of resources which is to be used based on the access request. Specifically, it calculates the amount of resources to be used based on an access area included in the access request, a writing speed to the storage unit 105 and a reading speed therefrom. Because the calculation method is a well-known technology, a description thereof is omitted here. The arbitration unit 103 judges whether or not the calculated amount of resources to be used is equal to or smaller than a total of an amount of unused resources managed by the management unit 112 (hereinafter, referred to as a "margin").

When the amount of resources to be used is equal to or smaller than the margin, the arbitration unit 103 receives the access request of the second access request unit 106a, and gives, to the received access request, an amount of resources equivalent to the amount of resources to be used out of the margin. At this time, the arbitration unit 103 updates the margin managed by the management unit 112 to a result which is obtained by subtracting the amount of resources to be used from the margin. Meanwhile, the details about the management unit 112 and the amount of unused resources are described later.

Also, when the amount of resources to be used is not equal to or smaller than the margin, the arbitration unit 103 judges whether or not it should select the access request of the second access request unit 106a as an access allowable target in accordance with an reception status of access requests of all the masters during a unit period, a remaining amount of time before the unit period elapses, and a priority comparison result with the other processors. Here, in order to judge, when it receives access requests of the processors D and E, to which of received access requests the arbitration unit 103 gives priority for selecting, the arbitration unit 103 preliminarily stores priorities corresponding to respective processors. When there are access requests of both the processors D and E in the arbitration unit 103 during the same unit period, the comparison of priority will be made. Here, the timing at which the access request of the second access request unit 106a is selected is the time immediately after another access processing ends in the case where the other access processing is executed at the time when the access request is received, or the time when the access request is received in the case where the other access processing is not executed. This means that the access request of the second access request unit 106a is selected under a situation where an access requested by another requester such as a master is not executed.

Meanwhile, the access request of the second access request unit 106a which was not selected by the arbitration unit 103 is masked until the access request is selected by the arbitration unit 103.

Also, when receiving an access request of a master which has to be made during a unit period and an access request of a processor during the unit period, the arbitration unit 103 preferentially selects the access request of the processor if a margin is equal to or larger than an amount of resources to be used, and a maximum amount of resources to be used is ensured for the master which makes the access request.

(4-3) Access Execution Unit 104

An access execution unit, 104 notifies a requester of an access request which has been selected by the selection unit 111 (a master or a processor) that the access request has been selected, accesses the storage unit 105, and reads and writes data in accordance with instructions from the master or the processor either of which is the requester. After completing the reading of the data from the storage unit 105, the access execution unit 104 outputs the read data to the master or the processor either of which is the requester. Also, after completing the writing of the data to the storage unit 105, it notifies the requester of the access of the result of the writing.

This enables accesses to the storage unit 105 requested by the master and the processor whose access requests are selected as an access allowable target to be executed.

(4-4) Management Unit 112

The management unit 112 stores a differential between a maximum amount of resources to be used which is given to the first access request unit having requested an access to the storage unit 105 and an amount of resources which was actually used by the access (hereinafter, referred to as an "amount of unused resources") and manages it. As shown in FIG. 1, it includes a used resource measurement unit 107 and an unused resource management unit 108.

(Used Resource Measurement Unit 107)

The used resource measurement unit 107 measures an amount of resources which was actually used by an access to the storage unit 105 in accordance with an access request selected by the selection unit 111 (hereinafter, referred to as an "amount of used resources").

Specifically, the used resource measurement unit 107 has a clock counter, and counts the number of clocks from a start till an end of an access using the clock counter. Meanwhile, not only reading and writing operation of data to the storage unit 105, but also an operation like bank switching is included in the operations performed from the start till the end of the access here.

(Unused Resource Management Unit 108)

The unused resource management unit 108 manages a margin during a unit period. As shown in FIG. 1, it includes an unused resource storage unit 130, an unused resource calculation unit 131 and a reset unit 132.

The unused resource storage unit 130 is a memory area for storing the margin during the unit period. Here, a default value of the margin is set at 0.

The unused resource calculation unit 131 calculates an amount of unused resources which was not actually used by an access to the storage unit 105 requested by a master and a processor being a requester of an access request selected by the storage unit 105.

The following describes the unused resource calculation unit 131 with use of a specific example.

When an access request of a master is selected as an access allowable target by the arbitration unit 103, the unused resource calculation unit 131 obtains a maximum amount of resources be used which is given to the master making the selected access request from the access control information table 300. The unused resource calculation unit 131 subtracts the amount of used resources measured by the used resource measurement unit 107 from the obtained maximum amount of resources. And the differential between them is calculated as an amount of unused resources. The unused resource calculation unit 131 adds the calculated amount of unused resources to a margin stored in the unused resource storage unit 130.

When an access request of a processor is selected as an access allowable target by the arbitration unit 103, the unused resource calculation unit 131 calculates a new margin by subtracting an amount of resources to be used which was calculated by the arbitration unit 103 from the margin stored in the unused resource storage unit 130 at the time, and updates the margin at the time to the new margin. And further, when an access executed in accordance with an access request of the processor selected by the arbitration unit 103 ends, the unused resource calculation unit 131 calculates an amount of unused resources by subtracting an amount of used resources measured by the used resource measurement unit 107, in other words, an amount of resources which was used based on the access requested by the processor whose access request was received, from the amount of resources to be used. And it adds the calculated amount of unused resources to the margin stored in the storage area at the time (that is, the above-mentioned margin after update).

The following describes the reset unit 132.

The reset unit 132 resets the margin stored in the unused resource storage unit 130 to a default value with respect to a unit period, in other words, with respect to one cycle. In particular, the reset unit 132 monitors whether or not the unit period has elapsed, and when judging that the unit period has elapsed by a result of the monitoring, it resets the margin stored in the unused resource storage unit 130 at the time to the default value. In terms of the monitoring method, for example, the reset unit 132 has a clock counter, and counts the unit period using the clock counter. It may use a clock counter which is provided outside. Any system can be adopted as long as a system in which the counting of 100 clocks, which is the unit period, can be monitored.

1.2 Operation of the Access Control Apparatus 10

The operation of the access control apparatus 10 is described here by separating into a case where an access request of a master occurs and a case where an access request of a processor occurs.

(1) When an Access Request of a Master Occurs

Figure 4:
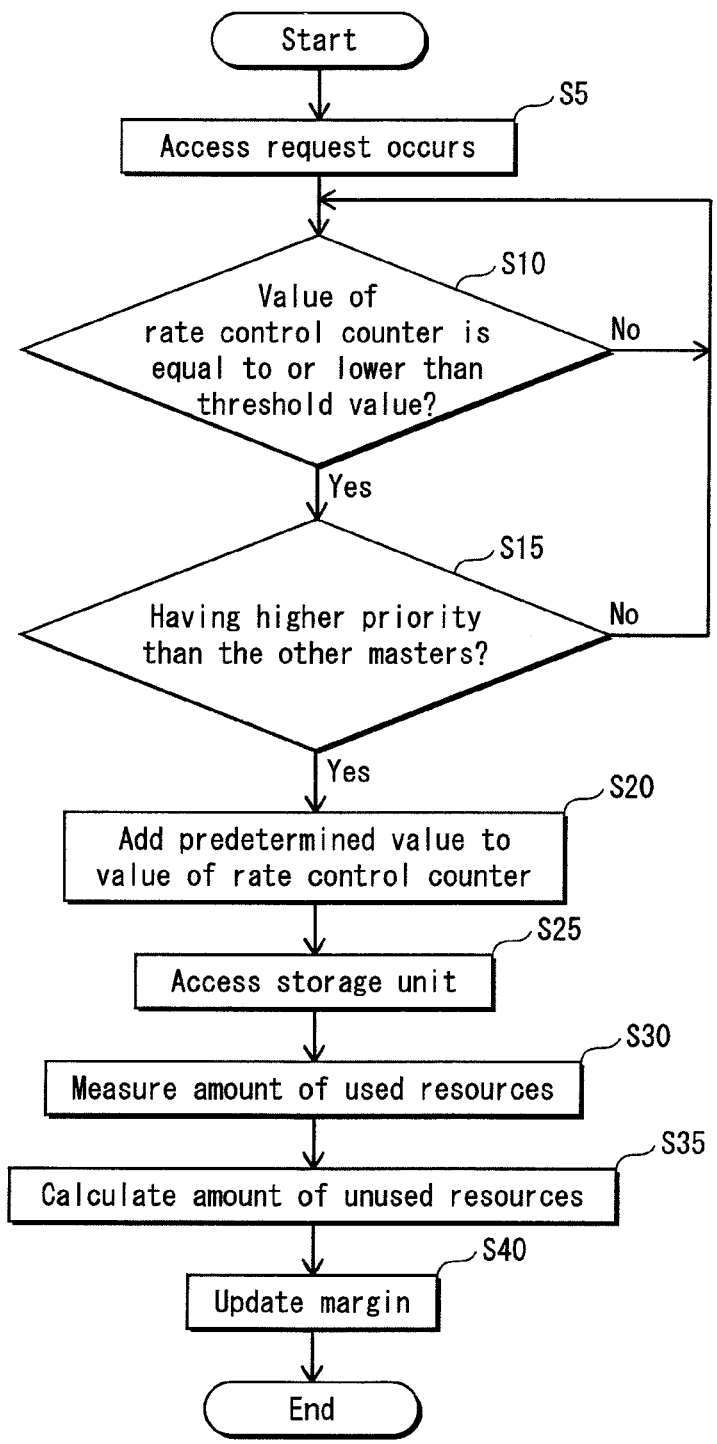
FIG. 4 is a flow chart showing an access control executed by the access control apparatus 10 when a master makes an access request.

The following describes the operation of the access control apparatus 10 when an access request of a master occurs with use of a flowchart shown in FIG. 4.

Even if an access request of any of the masters A, B and C occurs, there is no operational difference. So, an operation which is performed when an access request of the master A occurs is described here.

The access request of the master A (the first access request unit 101a) occurs (step S5).

The request control unit 102a judges whether or not a value indicated by its rate control counter is equal to or lower than a threshold value (a value "100" here) (step S10).

When judging that it is not equal to or lower than the threshold value ("NO" in step S10), processing is back to step S10.

When the request control unit 102a judges that it is equal to or lower than the threshold value ("YES" in step S10), the arbitration unit 103 judges whether or not it has a higher priority than the other masters, in other words, it judges whether or not the value of its rate control counter is equal to or lower than a value of the rate control counter included in each of other request control units 102b and 102c (step S15).

When judging that it does not have a higher priority than the other masters ("NO" in step S15), processing is back to step S10.

When judging that it has a higher priority than the other masters ("Yes" in step S15), the arbitration unit 103 selects the access request as an access allowable target and the request control unit 102a adds a predetermined value ("100") to the value of its rate control counter (step S20). The request control unit 102a continues to count down by using the rate control counter after it adds the value.

The access execution unit 104 accesses the storage unit 105 in accordance with instructions of a requester, that is, the master A, indicated by a requester type which is included in the access request selected by the arbitration unit 103 (step S25). In other words, the access execution unit 104 reads data from the storage unit 105 and writes data to the storage unit 105 in accordance with the instructions of the master A.

The used resource measurement unit 107 measures an amount of used resources which was used based on an access requested by a requester, that is the master A, whose access request was selected by the selection unit 111 (step S30).

The unused resource calculation unit 131 calculates an amount of unused resources by subtracting the amount of used resources measured by the used resource measurement unit 107 from a maximum amount of resources to be used which is given to the master A (step S35). The unused resource calculation unit 131 adds the calculated amount of unused resources to the margin stored in the unused resource storage unit 130 and updates the stored margin (step S40).

(2) When an Access Request of a Processor Occurs

Figure 5:
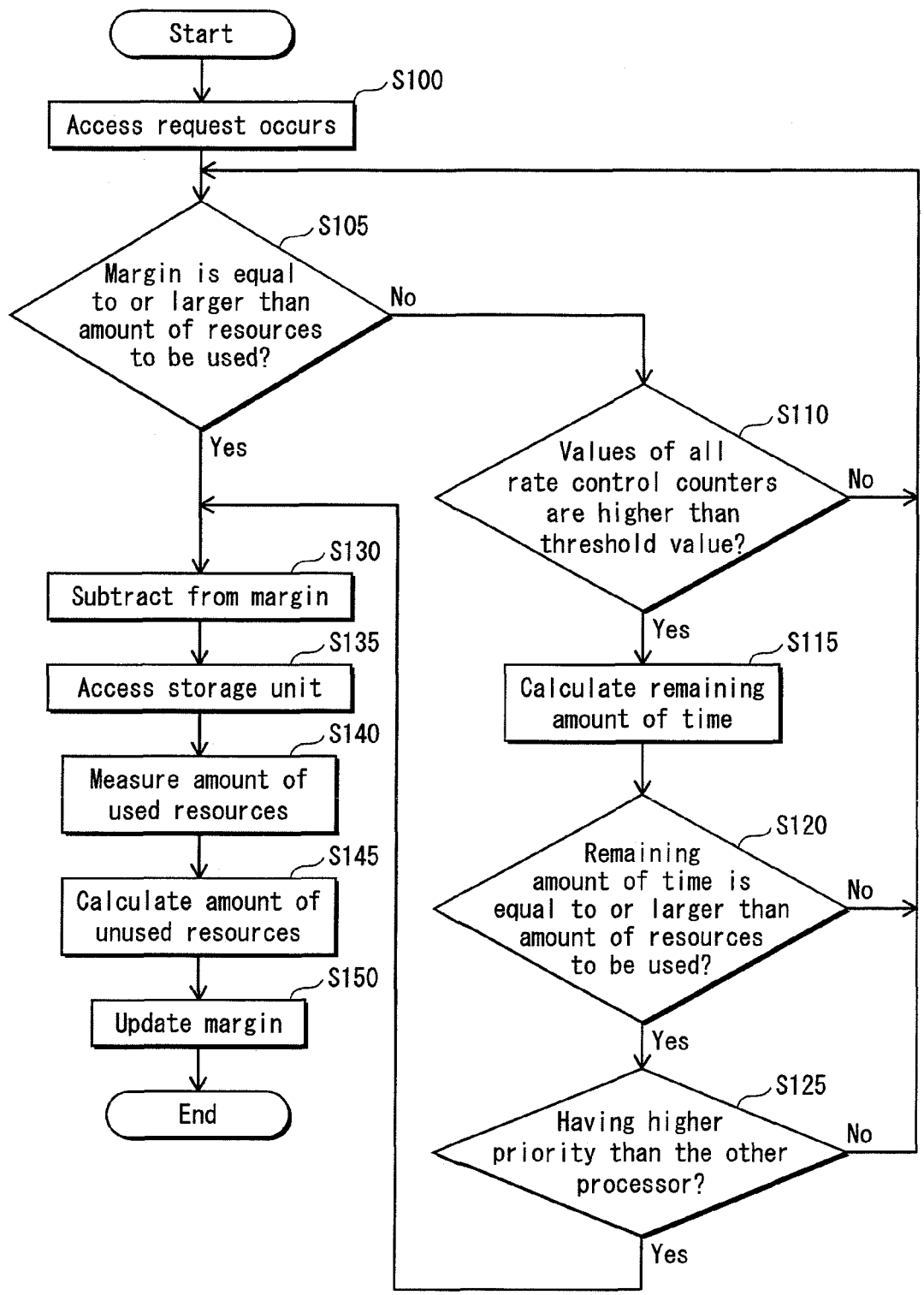
FIG. 5 is a flow chart showing an access control executed by the access control apparatus 10 when a processor makes an access request.

The following describes the operation of the access control apparatus 10 when an access request of a processor occurs with use of a flowchart shown in FIG. 5.

Even if an access request of either of the processors D or E occurs, there is no operational difference. So, the operation which is performed when an access request of the processor D occurs is described here.

The access request of the processor D (the second access request unit 106a) occurs (step S100).

The arbitration unit 103 calculates an amount of resources to be used based on an access area included in the access request of the processor D. The arbitration unit 103 judges whether or not the margin stored in the unused resource storage unit 130 is equal to or larger than the calculated amount of resources to be used (step S105).

When judging that the margin is equal to or larger than the calculated amount of resources to be used ("YES" in step S105), the arbitration unit 103 subtracts the amount of resources to be used from the margin stored in the unused resource storage unit 130 and updates the margin to the result of the subtraction (step S130). The access execution unit 104 accesses the storage unit 105 in accordance with instructions of a requester, that is, the processor D, indicated by a requester type which is included in the access request selected by the arbitration unit 103 (step S135). In other words, the access execution unit 104 reads data from the storage unit 105 and writes data to the storage unit 105 in accordance with the instructions of the processor D. The used resource measurement unit 107 measures an amount of used resources which was used based on the access requested by a requester, that is, the processor D, whose access request was selected by the selection unit 111 (step S140). The unused resource calculation unit 131 calculates an amount of unused resources by subtracting the amount of used resources measured by the used resource measurement unit 107 from the amount of resources to be used by the processor D which was calculated by the arbitration unit 103 (step S145). The unused resource calculation unit 131 adds the calculated amount of unused resources to the margin which is stored in the unused resource storage unit 130 and updates the stored margin (step S150).

When judging that the margin is not equal to or larger than the calculated amount of resources to be used ("NO" in step S105), the arbitration unit 103 judges whether or not values indicated by the rate control counters each of which is included in the request control units 102a, 102b and 102c are equal to or higher than a threshold value ("100") (step S110). When judging that the values indicated by the rate control counters are equal to or higher than the threshold value ("YES" in step S110), the arbitration unit 103 calculates a remaining amount of time from the unit period to which the present time belongs till the next unit period (step S115). The arbitration unit 103 judges whether or not the calculated remaining amount of time is equal to or larger than the amount of resources to be used (step S120). When judging that the remaining amount of time is equal to or larger than the amount of resources to be used ("YES" in step S120), the arbitration unit 103 judges whether or not the processor D has a higher priority than the other processor (processor E) when there is an access request of the other processor (step S125). When judging that it has a higher priority ("YES" in step S125), processing moves to step S130 and is continued. When judging that the values indicated by the rate control counters are not equal to or higher than the threshold value ("NO" in step S110), when judging that the remaining amount of time is not equal to or larger than the amount of resources to be used ("NO" in step S120) and when judging that the processor D does not have a higher priority than the other processor ("NO" in step S125), processing is back to step S105. When there is no access request of the processor E, the judgment in step S125 is not performed and processing moves to S130.

(3) Measurement Processing

Figure 6:
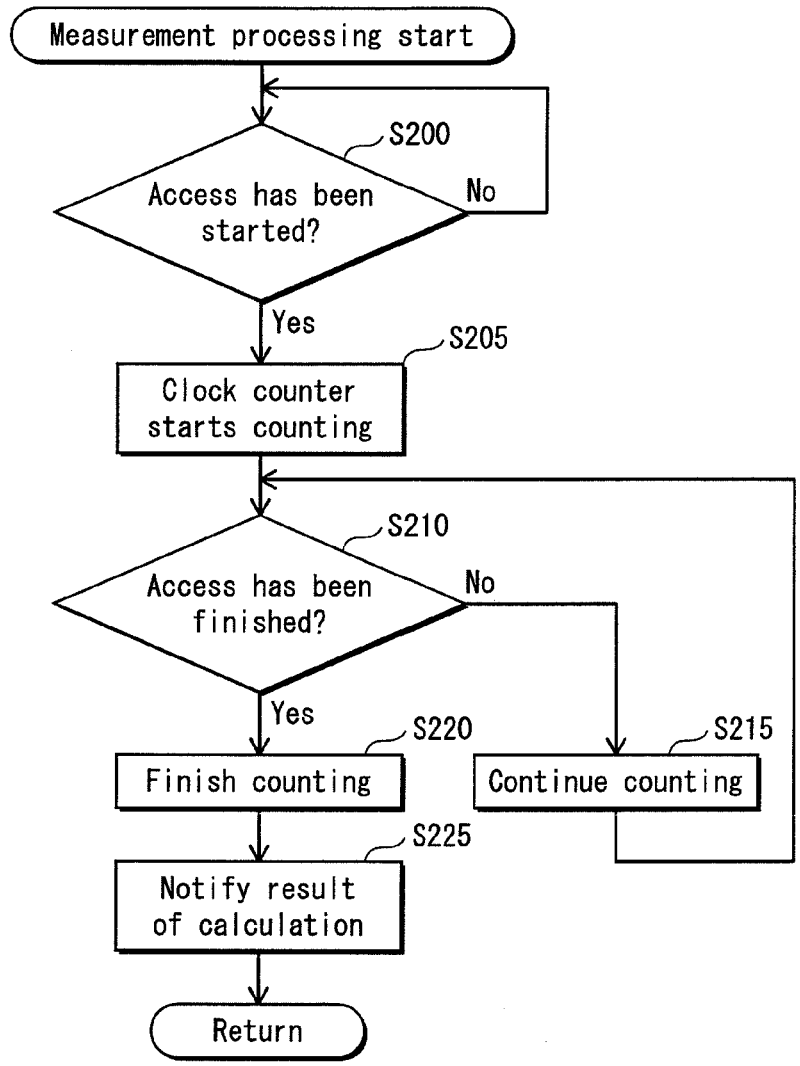
FIG. 6 is a flow chart showing a process of measuring an amount of used resources.

The following describes the operation to measure an amount of used resources which is indicated by step S30 in FIG. 4 and by step S140 in FIG. 5 with use of a flowchart shown in FIG. 6.

The used resource measurement unit 107 judges whether or not an access has been started by the access execution unit 104 (step S200).

When judging that the access has not been started ("NO" in step S200), the processing of step S200 is performed again.

This means that step S200 is repeated as a loop until the access is started by the access execution unit 104.

When judging that the access has been started ("YES" in step S200), the used resource measurement unit 107 starts counting using its clock counter (step S205).

The used resource measurement unit 107 judges whether or not the access has been finished by the access execution unit 104 (step S210).

When judging that the access has not been finished ("NO" in step S210), the used resource measurement unit 107 continues to count using the clock counter (step S215), and processing is back to step S210.

When judging that the access has been finished ("YES" in step S210), the used resource measurement unit 107 stops counting by using the clock counter (step S220), and notifies the unused resource calculation unit 131 of a result of the counting (step S225).

1.3 Examples of the Application

The following describes examples of the application of the access control apparatus 10.

(1) Example of the Application 1

Figure 7:
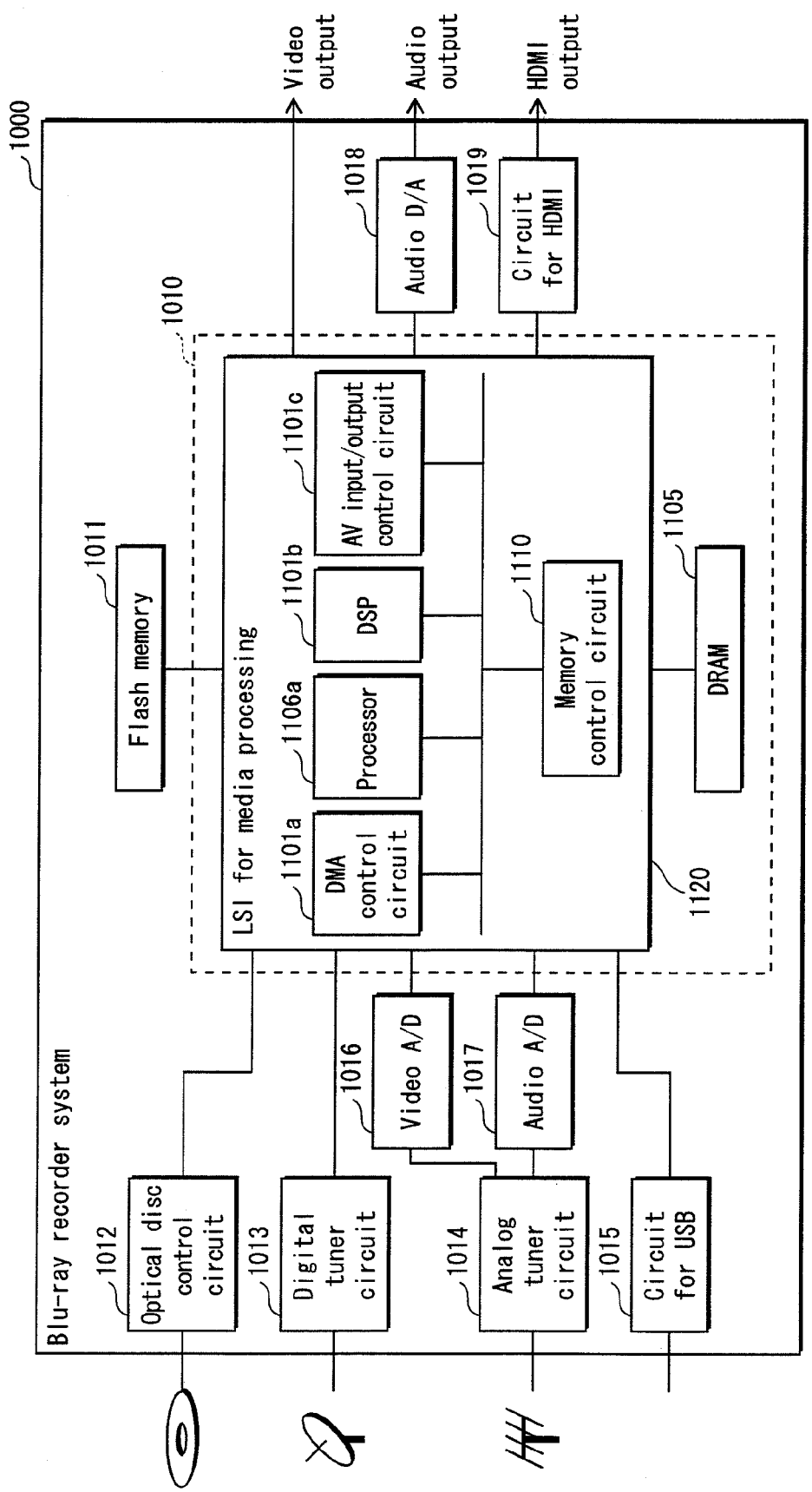
FIG. 7 shows the case where the access control apparatus 10 is applied to a Blu-ray™ recorder system 1000.

FIG. 7 shows a configuration example of a system in which the access control apparatus 10 in this embodiment is applied to a Blu-ray™ recorder system 1000.

The Blu-ray™ recorder system 1000 is composed of DRAM 1105, a flash memory 1011, an optical disc control circuit 1012, a digital tuner circuit 1013, an analog tuner circuit 1014, a circuit for USB 1015, a video A/D 1016, an audio A/D 1017, an audio D/A 1018, a circuit for HDMI (High-Definition Multimedia Interface) 1019 and an LSI for media processing 1120.

The optical disc control circuit 1012 performs processing relating to reading of data from a Blu-ray™ disc inserted in the system 1000 and writing thereof to the disc. The digital tuner circuit 1013 receives digital airwaves and performs processing relating to conversion from the received digital airwaves to digital signals. The analog tuner circuit 1014 receives analog airwaves and performs processing relating to conversion from the received analog airwaves to analog signals. The video A/D 1016 performs processing relating to conversion from analog video signals, from among analog signals converted by the analog tuner circuit 1014, to digital video signals. The audio A/D 1017 performs processing relating to conversion from analog audio signals, from among analog signals converted by the analog tuner circuit 1014, to digital audio signals. The circuit for USB 1015 performs processing relating to reading of data from an external apparatus connected to the system 1000 by a USB and writing thereof to the external apparatus. The audio D/A 1018 converts digital audio signals processed by the LSI for media processing 1120 to analog audio signals and outputs the converted analog audio signals to outside (e.g. a television). The circuit for HDMI 1019 outputs digital video signals and the digital audio signals which are processed by the LSI for media processing 1120 to outside.

The flash memory 1011 stores data.

An apparatus 1010 which is composed of the LSI for media processing 1120 and the DRAM corresponds to the access control apparatus 10 in this embodiment.

The DRAM 1105 stores data as the flash memory 1011 does and corresponds to the storage unit 105 in this embodiment.

As shown in FIG. 7, the LSI for media processing 1120 is composed of a DMA (Direct Memory Access) control circuit 1101a, a DSP (Digital Signal Processor) 1101b, an AV input/output control circuit 1101c, a processor 1106a and a memory control circuit 1110.

Each of the DMA control circuit 1101a, the DSP 1101b and the AV input/output control circuit 1101c corresponds to a master in this embodiment.

The DMA control circuit 1101a inputs/outputs data between outside (e.g. the flash memory 1011) and the DRAM 1105.

The DSP 1101b processes audio, image and the like.

The AV input/output control circuit 1101c performs processing relating to input/output of audio data and video data.

The processor 1106a corresponds to the processor in this embodiment and irregularly accesses the DRAM 1105.

The memory control circuit 1110 corresponds to the access control unit 110 in this embodiment. It receives access requests from the DMA control circuit 1101a, the DSP 1101b, the AV input/output control circuit 1101c and the processor 1106a, selects an access allowable target, and accesses the DRAM 1105 in accordance with the selected access request.

In this way, the access control apparatus 10 in this embodiment can be applied to the Blu-ray™ recorder system 1000.

Also, the DMA control circuit 1101a is conventionally provided with an arbitration circuit. SO, the DMA control circuit 1101a may be provided with the access control unit in this embodiment, the optical disc control circuit 1012, the digital tuner circuit 1013, the analog tuner circuit 1014 and the circuit for USB may be considered as the masters in this embodiment, and the processor 1106a may correspond to the processor in this embodiment.

(2) Example of the Application 2

Figure 8:
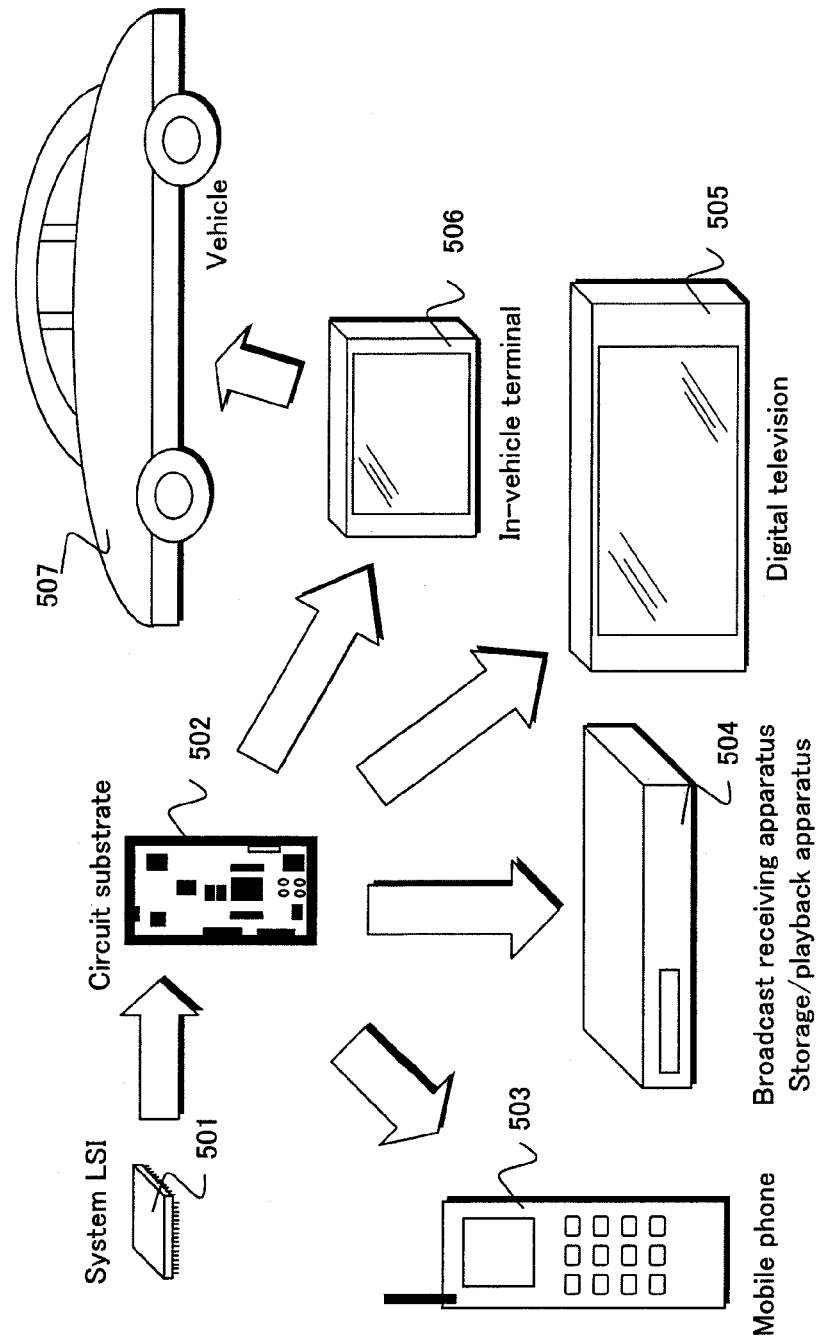
FIG. 8 shows an example of the application of the access control apparatus 10.

FIG. 8 shows a system LSI 501 which is equipped with the access control apparatus 10 in this embodiment and an example of the application in which the system is set.

By equipping the system LSI 501 with the access control apparatus 10 in this embodiment and manufacturing a circuit substrate 502 including the system LSI 501, the access control apparatus 10 can be applied to many products like a mobile phone 503, an apparatus 504 such as a broadcast receiving apparatus and a storage/playback apparatus, a digital television 505, an in-vehicle terminal 506 and a vehicle 507 equipped with the in-vehicle terminal 506.

1.4 Specific Example

Figure 9:
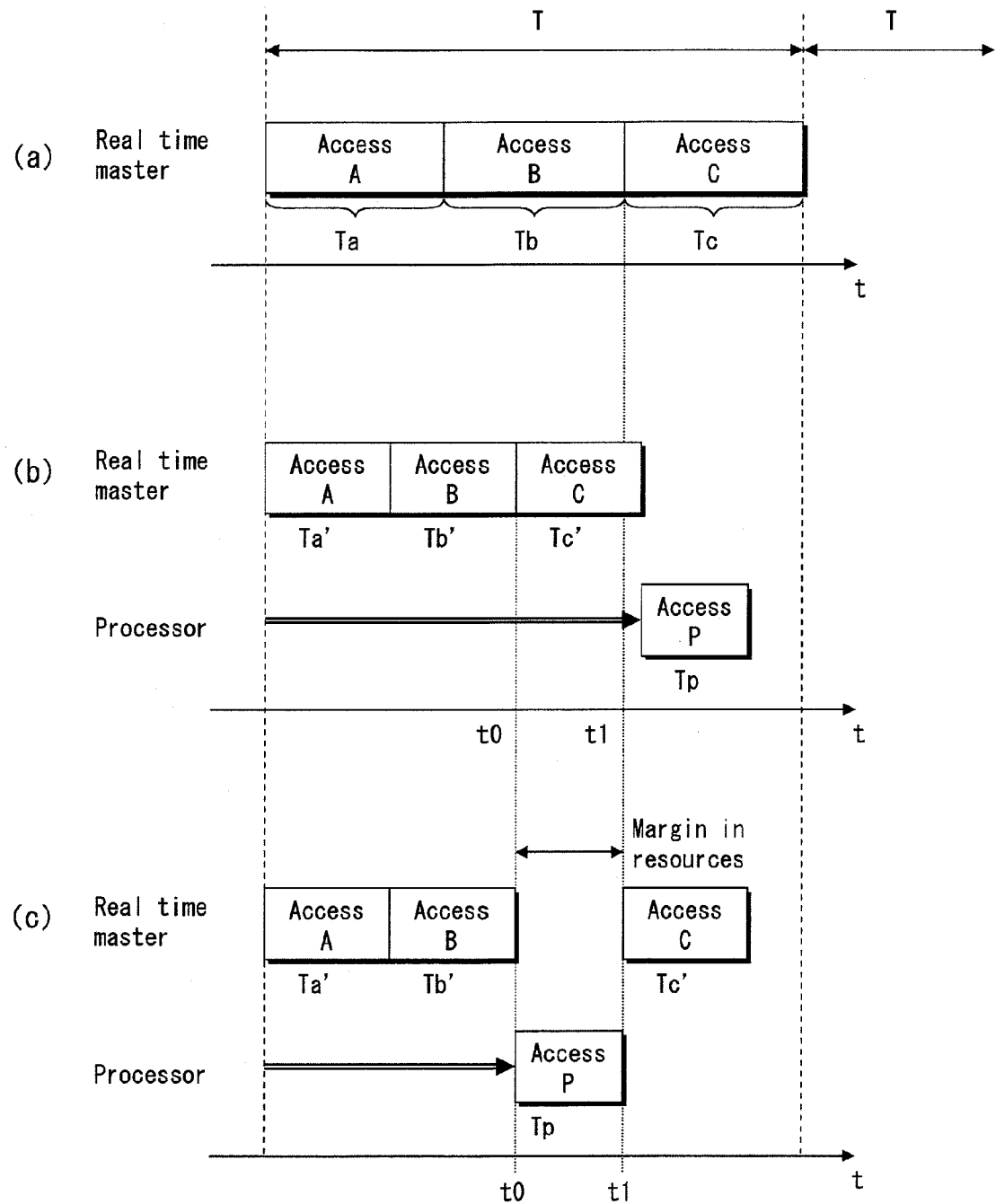
FIG. 9 shows a specific example of an access control executed by the access control apparatus 10.

FIG. 9 shows a specific example of an access control executed by the access control apparatus 10.

FIG. 9(a) shows that rates (clocks (an amount of resources)) required for accesses requested by the real time masters (the masters A, B and C) are ensured by each of the accesses using a period Ta, Tb and Tc in a unit period T. The same rates are ensured for the respective masters here.

Usually, the accesses A, B and C which occur actually do not always use the period Ta, Tb and Tc because of factors like bank switching of a memory. For example, as shown in FIG. 9(b), there is a case where each of the accesses uses only a period Ta', Tb' and Tc'.

At this time, information showing how many clocks were actually used during the unit period T is not provided in the conventional technology, so required rates are ensured first by giving priority to the accesses A, B and C which are requested by each of the masters A, B and C over an access which is requested by a processor. For this reason, an access P which is requested by the processor has to be kept waiting until the accesses A, B and C have been processed.

However, because the access control apparatus 10 in this embodiment measures actual access periods Ta', Tb' and Tc', as shown in FIG. 9(c), it can recognize that there is a margin to execute the access P to the resources requested by the processor at the time t0 with no need to execute all the memory accesses requested by the masters A, B and C. Therefore, it can preferentially process the access P before the access C is executed (It can improve responsiveness).

With the structure indicated by the access control apparatus 10, the used resource measurement unit 107 can measure an amount of resources used by the access execution unit 104, and the unused resource calculation unit 131 can calculate an amount of disused resources based on the amount of used resources measured by the used resource measurement unit 107 and a maximum amount of resources to be used stored in the access control information storage unit 109. Also, the unused resource storage unit 130 manages the disused resources as a margin and the arbitration unit 103 uses the margin. This enables processing for an access request of a processor to be performed promptly if there is a margin in an amount of unused resources. As a result, responsiveness to a processor can be improved.

Figure 10:
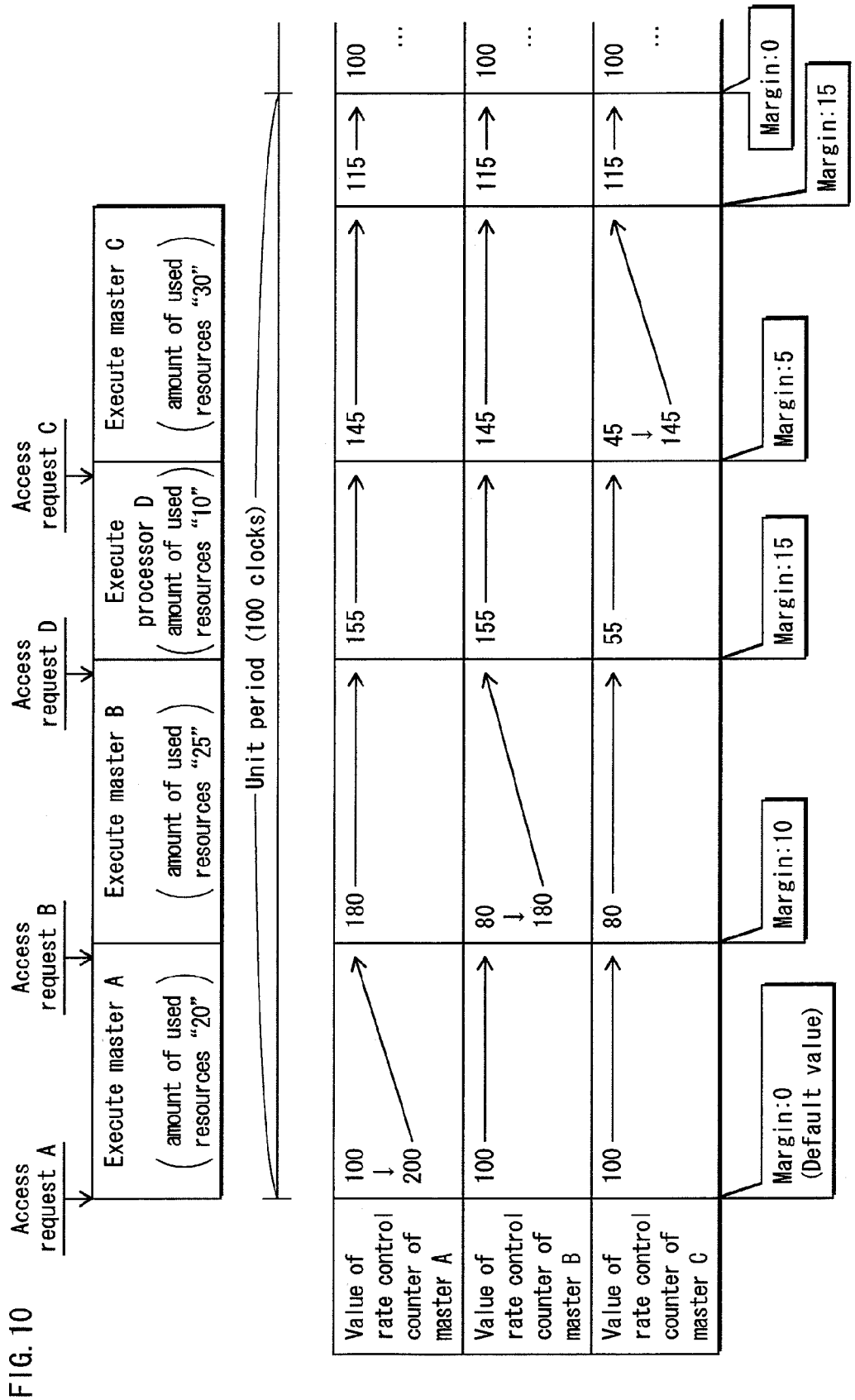
FIG. 10 shows transition of each rate control counter.

FIG. 10 shows a transition of the margin.

The following describes the transition of the margin with use of FIGS. 4, 5 and 10.

As described above, a default value of the rate control counter which is included in each of the request control units 102a, 102b and 102C is set at 100, and, as shown in FIG. 3, the maximum amounts of resources to be used "30", "30" and "40" are given to them respectively here.

When an access request A of the master A occurs, a predetermined value "100" is added to the value "100" of the rate control counter included in the request control unit 102a by step S20 in FIG. 4. Then, an access requested by the master A is executed by step S25 and an amount of used resources which was used at the time is measured by the used resource measurement unit 107 by step S30. It is assumed here that an amount of used resources "20" is measured. As a result, by step S35 and S40, a margin comes to "10", and values indicated by the rate control counters included in the request control units 102a, 102b and 102c come to "180", "80" and "80" respectively.

Next, when an access request B of the master B occurs, a predetermined value "100" is added to a value "80" of the rate control counter included in the request control unit 102b by step S20 in FIG. 4. Then, an access requested by the master B is executed by step S25 and an amount of used resources which was used at the time is measured by step S30. It is assumed here that an amount of used resources "25" is measured. As a result, by step S35 and S40, the margin comes to "15", and values indicated by the rate control counters included in the request control units 102a, 102b and 102c come to "155", "55" and "55" respectively.

Next, when an access request D of the processor D occurs, whether or not the margin is equal to or larger than an amount of resources which is to be used based on the access request D (in this example, "15") is judged by step S105 in FIG. 5. As a result, processing moves to step S130. The amount of resources to be used is subtracted from the margin, and, as a result, a new margin comes to "0".

And then, an access requested by the processor D is executed by step S135 and an amount of resources which was used at the time is measured by step S140. It is assumed here that an amount of used resources "10" is measured. And, by step S145, an amount of unused resources "5" which was not used based on an access requested by the processor D is calculated. And, by step S150, the amount of unused resources "5" calculated by step S145 is reflected in the margin, as a result the margin managed by the unused resource storage unit 130 comes to "5". Values indicated by the rate control counters included in the request control units 102a, 102b and 102c come to "145", "145" and "45" respectively at this time.

Next, when an access request C of the master C occurs, a predetermined value "100" is added to a value "45" of the rate control counter included in the request control unit 102c by step S20 in FIG. 4. Then, an access requested by the master C is executed by step S25 and an amount of used resources which was used at the time is measured by step S30. It is assumed here that an amount of used resources "30" is measured. As a result, by step S35 and S40, the margin comes to "15", and values indicated by the rate control counters included in the request control units 102a, 102b and 102c come to "115", "115" and "115" respectively.

After that, the margin "15" is reset to a default value "0" after a unit period has elapsed.

Meanwhile, when the access request C and the access request D occur during an execution of an access requested by the master B, the access request D is preferentially selected, because there is the margin "15" and a maximum amount of resources to be used is ensured for the master C when the execution of the access requested by the master B ends.

1.5 Others

In this embodiment, each of the request control units 102a, 102b and 102c includes a rate control counter for counting down to ensure predetermined rates during a unit period, it may include that for counting up.

Although the case where the margin is used by a processor is described here, it may be used by another real time master, a refresh, a graphics engine, a network engine and the like.

The access control apparatus in this embodiment preliminarily determines rates (maximum amounts of resources to be used) which are required by the real time masters and calculates a margin based on the predetermined rates and a measured value, but not limited to this. For example, the access control apparatus may have a means for calculating rates to be the margin based on the predetermined rates and an amount of resources in a whole system and may have a means for setting the calculated rates.

Also, in this embodiment, the margin occurs when an access requested by the real time master occurs and the rates which was actually used by the access is fewer than the required rates. And the processor preferentially uses the margin. However, the margin may be preferentially used by the real time master. Alternatively, the access control apparatus may have a means by which the real time master uses the margin a certain number of times during a predetermined period. Also it may have a means for selecting a way to use the margin to access the resources, and a means for setting which to choose.

2. Embodiment 2

In the following, embodiment 2 of the present invention is described with reference to the attached drawings.

2.1 Structure of an Access Control Apparatus 10A

Figure 11:
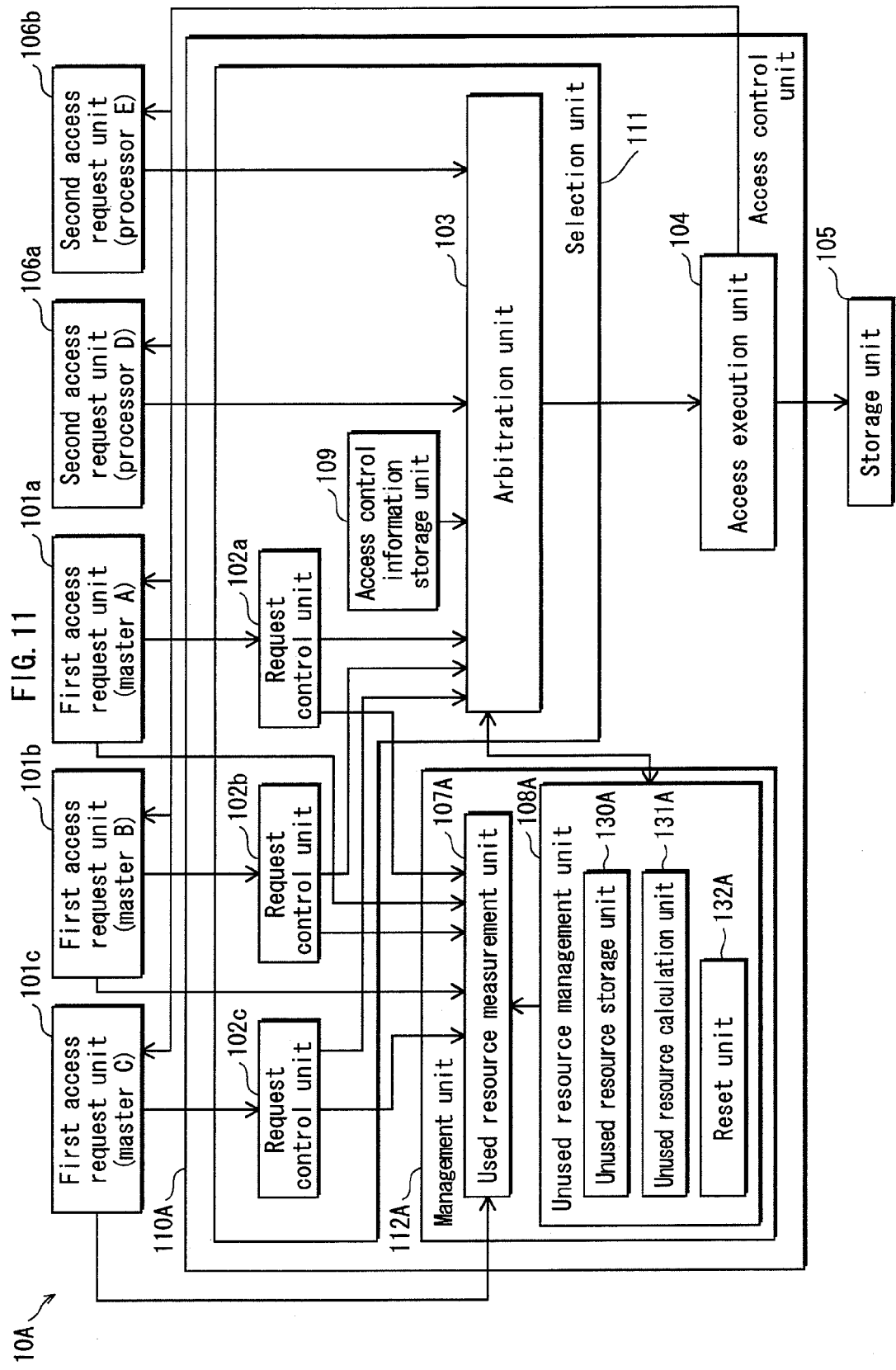
FIG. 11 is a block diagram showing the structure of an access control apparatus 10A.

FIG. 11 is a block diagram showing the structure of an access control apparatus 10A in embodiment 2 of the present invention.

In the following, the same numbers are assigned to elements which are same as those in embodiment 1. And description thereof is omitted here.

As shown in FIG. 11, the access control apparatus 10A is composed of the first access request units 101a, 101b and 101c (hereinafter, they are also referred to as the "masters A, B and C" respectively similarly to the embodiment 1), second access request units 106a, 106b, an access control unit 110A and a storage unit 105.

The following describes the access control unit 110A.

(1) Access Control Unit 110A

The access control unit 110A controls, during a unit period, accesses executed upon access requests from the first access request units 101a, 101b and 101c and the second access request units 106a and 106b similarly to the access control unit 110 shown in the embodiment 1. As shown in FIG. 11, it includes a selection unit 111, a management unit 112A and an access execution unit 104. Meanwhile, a data structure of the access request is same as that shown in FIG. 2.

The management unit 112A is described here.

The management unit 112A calculates an amount of unused resources and manages it as a margin similarly to that in embodiment 1. The difference from the management unit 112 in embodiment 1 is a timing of calculating the amount of unused resources.

The following describes details thereabout.

When an access request of a processor occurs during a predetermined period, the management unit 112A calculates a margin at the time and manages it. As shown in FIG. 11, it includes a used resource measurement unit 107A and an unused resource management unit 108A.

(Used Resource Measurement Unit 107A)

When the arbitration unit 103 receives access requests of the processor D or E during the predetermined period, if an access request which has to be processed during a predetermined period is being received by each of the request control units 102a, 102b and 102c, the used resource measurement unit 107A calculates (predicts) an amount of used resources based on a size of an access area included in the access request. Specifically, the used resource measurement unit 107A calculates the amount of used resources based on the access area included in the access request of the request control unit when the access request is being received by the request control unit and a value of its rate control counter is 100.

The used resource measurement unit 107A notifies the unused resource management unit 108A of the calculated amount of used resources along with a requester type indicating a requester of the access request.

If the used resource measurement unit 107A has calculated amounts of used resources for a plurality of request control units respectively, it notifies the unused resource management unit 108A of each of the calculated amounts of used resources along with each of requester types.

(Unused Resource Management Unit 108A)

The unused resource management unit 108A calculates an amount of unused resources based on the calculated amount of used resources and a maximum amount of resources which is given to the requester of the access request being a target of the calculation and manages it. As shown in FIG. 11, it includes an unused resource storage unit 130A, an unused resource calculation unit 131A and a reset unit 132A.

The unused resource storage unit 130A is a memory area for storing a margin during the unit period similar to the unused resource storage unit 130 in embodiment 1. Here, a default value of the margin is set at 0.

The reset unit 132A also resets the margin stored in the unused resource storage unit 130A to the default value with respect to the unit period similarly to the reset unit 132 in embodiment 1.

The unused resource calculation unit 131A calculates an amount of unused resources for the access request being a target of the calculation of the amount of used resources.

The following describes the unused resource calculation unit 131A with use of a specific example.

When receiving the amount of used resources and the requester type from the used resource measurement unit 107A, the unused resource calculation unit 131A obtains a maximum amount of resources given to the master being the requester indicated by the requester type from the access control information table 300 included in the access control information storage unit 109. The unused resource calculation unit 131A calculates an amount of unused resources by subtracting the amount of used resources received from the used resource measurement unit 107A from the obtained maximum amount of resources. And it adds the calculated amount of unused resources to the margin stored in the unused resource storage unit 130A.

When the arbitration unit 103 selects an access request of the processor as an access allowable target, the unused resource calculation unit 131A calculates a new margin by subtracting the amount of resources to be used calculated by the arbitration unit 103 from the margin which is stored in the unused resource storage unit 130A at the time, and updates the margin at the time to the new margin.

2.2 Operation of the Access Control Apparatus 10A

The operation of the access control apparatus 10A is described here by separating into a case where an access request of a master occurs and a case where an access request of a processor occurs.

(1) When an Access Request of a Master Occurs

Figure 12:
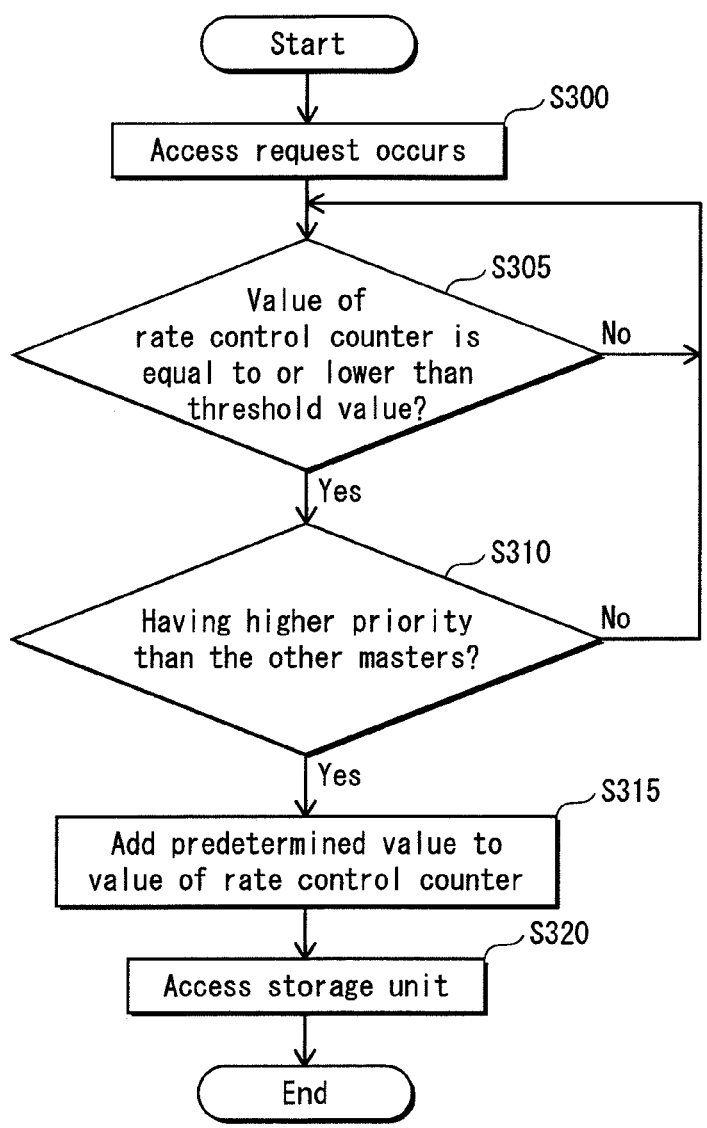
FIG. 12 is a flowchart showing an access control executed by the access control apparatus 10A when a master makes an access request.

The following describes the operation of the access control apparatus 10A when an access request of a master occurs with use of a flowchart shown in FIG. 12.

Even if an access request of any of the masters A, B and C occurs, there is no operational difference. So, the operation which is performed when an access request of the master A occurs is described here.

An access request of the master A (the first access request unit 101a) occurs (step S300).

The request control unit 102a judges whether or not a value indicated by its rate control counter is equal to or lower than a threshold value (in this example, a value "100") (step S305).

When judging that it is not equal to or lower than the threshold value ("NO" in step S305), processing is back to step S305.

When the request control unit 102a judges that it is equal to or lower than the threshold value ("YES" in step S305), the arbitration unit 103 judges whether or not it has a higher priority than the other masters (step S310).

When judging that it does not have a higher priority than the other masters ("NO" in step S310), processing is back to step S305.

When judging that it has a higher priority than the other masters ("Yes" in step S310), the arbitration unit 103 selects the access request as an access allowable target and the request control unit 102a adds a predetermined value ("100")

to the value of its rate control counter (step S315). The request control unit 102a continues to count down by using the rate control counter after it adds the value.

The access execution unit 104 accesses the storage unit 105 in accordance with instructions of a requester, that is, the master A, indicated by a requester type which is included in the access request selected by the arbitration unit 103 (step S320).

(2) When an Access Request of a Processor Occurs

Figure 13:
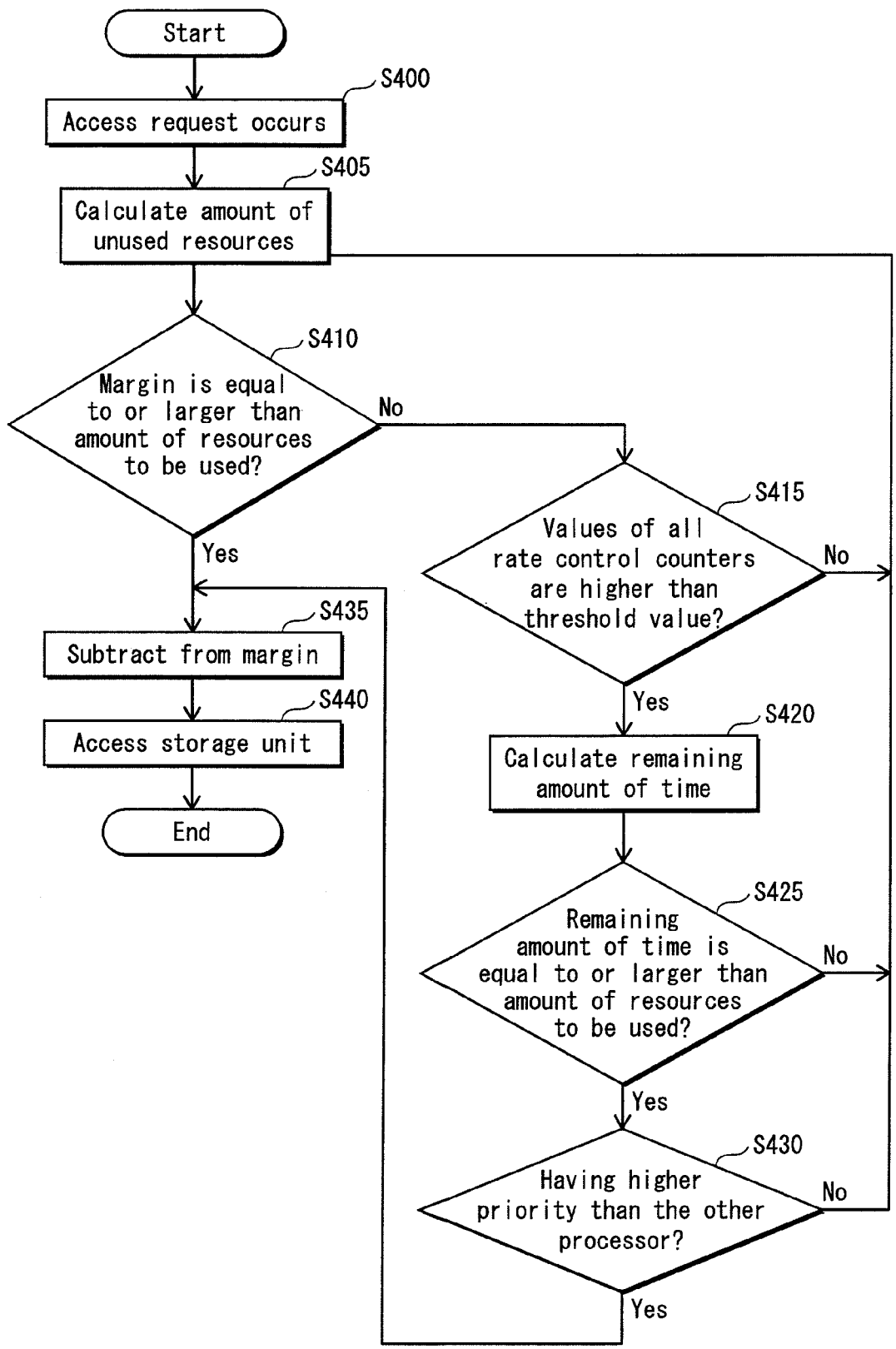
FIG. 13 is a flowchart showing an access control executed by the access control apparatus 10A when a processor makes an access request.

The following describes the operation of the access control apparatus 10A when an access request of a processor occurs with use of a flowchart shown in FIG. 13.

Even if an access request of either of the processors D or E occurs, there is no operational difference. So, the operation which is performed when an access request of the processor D occurs is described here.

An access request of the processor D (the second access request unit 106a) occurs (step S400).

If an access request which has to be processed during the predetermined period is being received by each of the request control units 102a, 102b and 102c, the used resource measurement unit 107A calculates an amount of used resources based on a size of an access area included in the access request. The unused resource calculation unit 131A calculates an amount of unused resources by subtracting the calculated amount of used resources from a maximum amount of resources given to the master, which is the requester of the access request being a target of the calculation (step S405).

The unused resource calculation unit 131A adds the calculated amount of unused resources to the margin stored in the unused resource storage unit 130. The arbitration unit 103 judges whether or not the margin which is the result after the addition is equal to or larger than an amount of resources which is to be used based on the access request of the processor D (step S410).

When judging that the margin is equal to or larger than the amount of resources to be used ("YES" in step S410), the arbitration unit 103 subtracts the amount of resources to be used from the margin stored in the unused resource storage unit 130 and updates the margin to the result of the subtraction (step S435).

The access execution unit 104 accesses the storage unit 105 in accordance with instructions of a requester, that is, the processor D, indicated by a requester type which is included in the access request selected by the arbitration unit 103 (step S440).

When judging that the margin is not equal to or larger than the amount of resources to be used ("NO" in step S410), the arbitration unit 103 judges whether or not values indicated by the rate control counters each of which is included in the request control units 102a, 102b and 102c are equal to or higher than a threshold value ("100") (Step S415). When judging that the values indicated by the rate control counters are equal to or higher than the threshold value ("YES" in step S415), the arbitration unit 103 calculates a remaining amount of time from the unit period to which the present time belongs till the next unit period (step S420). The arbitration unit 103 judges whether or not the calculated remaining amount of time is equal to or larger the amount of resources to be used (step S425). When judging that the remaining amount of time is equal to or larger than the amount of resources to be used ("YES" in step S425), the arbitration unit 103 judges whether or not the processor D has a higher priority than the other processor (the processor E) when there is an access request of the other processor (step S430). When judging that it has a higher priority ("YES" in step S430), processing moves to step S435 and is continued. When judging that the values indicated by the rate control counters are not equal to or higher than the threshold value ("NO" in step S415), when judging that the remaining amount of time is not equal to or larger than the amount of resources to be used ("NO" in step S425) and when judging that the processor D does not have a higher priority than the other processor ("NO" in step S430), processing is back to step S410. When there is no access request of the processor E, the judgment in step S430 is not performed and processing moves to S435.

2.3 Others

In embodiment 2, the margin is calculated based on information contained in the request control units 102a, 102b and 102c without measuring actual accesses which are executed to the storage unit 105. An amount of used resources which has to be used can be known based on an access area included in an access request received by each of the request control units 102a, 102b and 102c. And if a requester of the access request can be identified, a maximum amount of resources to be used of a master being the requester can be known.

The following describes the above characteristics taking FIG. 9 as a specific example. Since the arbitration unit 103 receives an arbitration request at a timing t0 when an access B has been finished, in actuality an access C is transmitted to the access execution unit 104 a time period (Ta-Ta')+(Tb-Tb') earlier, which is a time period remains without being used by accesses A and B. By monitoring these timing, actual time period of each accesses can be known, and by referring to a value of the counter included in each of the request control units 102a, 102b and 102c which execute a rate control, actual access resources can be judged.

As for a master which periodically accesses a memory, a margin to access resources can be calculated by using a history of controlled access requests and a processing state in a master. When managing the history of access requests, for example, by obtaining average size of access areas which have been used before based on access areas included in the managed access requests of the master A, an amount of resources which is used based on an access request of the master A during a unit period can be calculated. Also, when managing the processing state in a master, for example, by managing an amount of resources used in each processing (an amount of used resources) as a past processing state of the master A, an average amount of used resources which has been used before can be calculated. The access control apparatus can consider the average amount of used resources as an amount of resources which is used based on an access request of the master A.

In embodiment 2, the used resource measurement unit 107A does not monitor an actual access executed by the access execution unit 104 at any time but calculates a margin in real time based on pieces of information like a value indicated by a rate control counter and a maximum amount of used resources when an access request of a processor occurs. This eliminates the need for measurement of resources, margin calculation by using a counter and the like at a time when accessing the storage unit 105.

In embodiment 2, the margin of resources is calculated in step S405 only when an access request of a processor occurs (step S400). Although there is an advantage of eliminating the need for managing the margin at any time by monitoring the access execution unit 104, there is a disadvantage that more resources are used for calculation than those used in embodiment 1 because of the need for calculating the margin to access resources when a request of a processor occurs.

3. Modifications

The present invention has been described based on, but is not limited to, the above embodiment. Cases such as the following are included in the present invention.

(1) In each of the above embodiments, although a cycle in which an access requested by each master is executed is described to be a same unit period (100 clocks), but not limited to this. The unit period may vary by master. In this case, the unit period which is given to each master is distinguished by associating each maximum amount of resources to be used with the unit period in the access control information table. Also, when an access request of a master is selected, the number of clocks indicated by the corresponding unit period is added to the value of the rate control counter as a predetermined value.

(2) In each of the above embodiments, although the number of clocks is used as an example of an amount of resources, but not limited to this.

For example, an access band for accessing the storage unit 105, access latency and an access cycle which is used by one access may be used as the amount of resources.

When using the access band as the amount of resources, the access control apparatus manages a margin by considering a band which is not used by an actual access as an amount of unused resources.

When using the access latency as the amount of resources, the access control apparatus manages a margin by considering a differential between maximum latency which is preliminarily given and latency which is actually measured as an amount of unused resources.

When using the access cycle which is used by one access as the amount of resources, the access control apparatus manages a margin by considering a differential between a maximum access cycle which is preliminarily given and an access cycle which is actually measured as an amount of unused resources.

(3) Also, in each of the above embodiments, although a rate value of each master (a value of a unit period "100") and a maximum amount of resources are preliminarily stored, in other words, are preliminarily incorporated in hardware, but not limited to this. The rate value and the maximum amount of resources may be given by being set by a processor and a master and the like.

(4) A period of an access which is executed upon receiving an access request is calculated by measuring the access executed by the access execution unit 104 in embodiment 1, and, in embodiment 2, it is calculated at a arbitration timing of the arbitration unit 103, in other words, at a timing when an access request of a processor occurs. However, the period of an access is not limited to these.

For example, by using information included in a command which indicates whether an access to be performed by the command is an access to an image and so on, an approximate value of an actual access period may be calculated. The margin can be managed by using the approximate value. The information included in the command is not only the information which indicates whether the access is that to an image but also information which indicates, for example, whether the access crosses access boundary in a DRAM, whether it crosses page boundary, whether it is a cache access at L1$ or L2$ and the like. Also, as for the above-mentioned approximate value of the access period and calculated margin, the access control apparatus may have means for giving them by setting a processor and the like as described above, or means for preliminarily incorporating them in hardware, and may have a circuit structure in which they are referred by a circuit structure like a look-up table. That is, it has means for setting, storing and referring the approximate value of the access period and the calculated margin.

(5) In each of the above embodiments, although an access request includes an access area, but not limited to this.

The access request may include an end address indicating an end position (address) of reading from the storage unit 105 or of writing to the storage unit 105 instead of the access area. In this case, the arbitration unit 103 calculates an amount of resources which is to be used based on an access request of a processor by calculating an area to be accessed based on a start address and the end address which are included in the access request.

(6) In the above embodiments, although a default value of the margin is set at 0, but not limited to this.

In a unit period (100 clocks), maximum amount of resources is given to each of the masters A, B and C, and remaining clocks which was not given to them may be set as a default value of the margin. For example, maximum amount of resources "30" is given to each of the masters A, B and C, the remaining clocks "10" is set as a default value of the margin.

(7) The above access control apparatus is specifically a computer system comprised of a micro processor, ROM, RAM, a hard disc unit, a display unit, a keyboard, a mouse and the like. A computer program is recorded on the RAM or the hard disc unit. By the micro processor operating in accordance with the computer program, the access control apparatus achieves its function. Here, the computer program is comprised of a combination of a plurality of instruction codes which each instructs the computer to achieve a predetermined function. Meanwhile, each of the apparatuses is not limited to the computer system comprising all of the micro processor, the ROM, the RAM, the hard disc unit, the display unit, the keyboard, the mouse and the like, it may be a computer system comprising a part of them.

(8) A part or all of the components constituting the above access control apparatus may be achieved in one system LSI (Large Scale Integration). The system LSI, which is a super-multifunctional LSI manufactured by integrating a plurality of components on one chip, is specifically a computer system comprised of a micro processor, ROM, RAM. A computer program is recorded in the RAM. By the micro processor operating in accordance with the computer program, the system LSI achieves its function.

Also, each component comprising each of the above access control apparatus may be achieved on one chip, or part or all thereof may be achieved on one chip.

Although the system LSI is taken for an example here, it may be called IC, LSI, super LSI, and ultra LSI, depending on a difference in integration degree. Also, the integrated circuit is not limited to the LSI, and it may be realized by a dedicated communication circuit or a universal processor. It may be realized by a FPGA (Field Programmable Gate Array) operable to program after the LSI being manufactured, or a reconfigurable processor operable to reconfigure a connection or setting of a circuit cell inside of the LSI.

And further, if a technology of an integrated circuit replacing a LSI comes out by a progress of a semiconductor technology or other derivative technology thereof, naturally the technology may be used for integration of functional blocks. Biotechnology and the like may be applied to this kind of technology.

(9) A part or all of the components constituting the above access control apparatus may be achieved as an IC card or a single module that is attachable/detachable to or from each apparatus. The IC card or the module is a computer system comprised of a micro processor, ROM, RAM. The IC card or the module may comprise the above super-multifunctional LSI. By the micro processor operating in accordance with the computer program, the IC card or the module achieves its function. The IC card or the module may be tamper resistant.

(10) The present invention may be methods shown by the above. The present invention may be a computer program that allows a computer to realize the methods, or may be a digital signal representing the computer program.

Also, the present invention may be a computer-readable recording medium such as a flexible disk, a hard disk, CD-ROM, MO, DVD, DVD-ROM, DVD-RAM, BD (Blu-ray Disc), or a semiconductor memory having been recorded with the computer program or the digital signal. Furthermore, the present invention may be the digital signal recorded in any of these recording medium.

Also, the present invention may be implemented by transmitting the computer program or the digital signal via a network represented by an electric communication line, a wireless or a wired communication line, and the internet, or a data broadcast.

Also, the present invention may be a computer system provided with a micro processor and a memory, the memory records the above computer program therein and the micro processor operates in accordance with the computer program.

Also, other independent computer system may implement the present invention by transferring the recording medium recorded with the computer program or the digital signal, or by transferring the computer program or the digital signal via the network and the like.

(11) The present invention may be any combination of the above embodiments and modifications.

The present invention can be administratively, that is to say, repeatedly and continuously used in industries manufacturing and retailing the access control apparatus.

Also, the access control method relating to the present invention is useful as a method for improving responsiveness to a sudden request from a user in an apparatus, like a digital television, a BD player and the like, which executes a plurality of tasks.

The invention claimed is:

1. An access control apparatus that receives access requests from (i) one or more type-1 masters for each of which a maximum amount of resources used to access a memory within a unit period is preliminarily determined and (ii) a type-2 master different from the type-1 masters, and sequentially selects one of the access requests as an allowable access request, the access control apparatus comprising:

a management unit operable to manage an amount of unused resources, the amount of unused resources being calculated, when each of the type-1 masters makes an access request within the unit period, by subtracting an amount of resources used by each of the type-1 masters having made the access request from the maximum amount of resources determined for each of the type-1 masters having made the access request, and a selection unit operable to, when one of the type-1 masters and the type-2 master make access requests within the unit period, select the access request made by the type-2 master as the allowable access request if a total amount of unused resources managed by the management unit is equal to or larger than an amount of resources to be used by the type-2 master, and select the access request made by the one of the type-1 masters as the allowable access request if the total amount of unused resources managed by the management unit is smaller than the amount of resources to be used by the type-2 master.

2. The access control apparatus of claim 1, wherein the amount of used resources is an amount of resources used from a start until an end of an access execution, and the management unit identifies the amount of resources used by each of the type-1 masters having made the access request by measuring an amount of resources used from a start until an end of an access execution by each of the type-1 masters having made the access request.

3. The access control apparatus of claim 2, wherein the management unit stores the total amount of unused resources, and when the access request made by type-2 master is selected as the allowable access request, the management unit measures an amount of resources used by the type-2 master, calculates a new total amount of unused resources by subtracting the measured amount of resources used by the type-2 master from the total amount of unused resources, and updates the total amount of unused resources with the new total amount of unused resources.

4. The access control apparatus of claim 1, wherein even when the total amount of unused resources is smaller than the amount of resources to be used by the type-2 master, the selection unit selects the access request made by the type-2 master as the allowable access request if it is judged that accesses to the memory by all the type-1 masters are to be executed within a unit period and an amount of remaining resources calculated based on a remaining amount of time within the unit period is equal to or larger than the amount of resources to be used by the type-2 master.

5. The access control apparatus of claim 1, wherein the management unit stores the total amount of unused resources, and when the unit period has elapsed, the management unit resets the total amount of unused resources to a predetermined value.

6. The access control apparatus of claim 1, wherein the maximum amount of resources determined for each of the type-1 masters is a maximum amount of time that a type-1 master is allowed to access the memory, the amount of resources used by the type-1 master is an amount of time taken by the type-1 master to access the memory, the amount of resources to be used by the type-2 master is an amount of time to be taken by the type-2 master to access the memory, and the management unit calculates an amount of unused access time by subtracting the amount of time taken by the type-1 master to access the memory from the maximum amount of time that the type-1 master is allowed to access the memory.

7. The access control apparatus of claim 1, wherein the amount of used resources is an amount of resources to be used to access the memory, and the management unit identifies the amount of resources used by a type-1 master by calculating an amount of resources to be used by the type-1 master to access the memory.

8. The access control apparatus of claim 7, wherein
each of the access requests includes specifying information for specifying a size of a memory area from which data is read or a size of a memory area to which data is written, and the management unit calculates the amount of resources to be used by the type-1 master to access the memory based on the size of the memory area specified by the specifying information included in the access request made by the type-1 master.

9. An access control method for use in an access control apparatus that receives access requests from (i) one or more type-1 masters for each of which a maximum amount of resources used to access a memory within a unit period is preliminarily determined and (ii) a type-2 master different from the type-1 masters, and sequentially selects one of the access request as an allowable access request, the access control method comprising the steps of:

managing an amount of unused resources, the amount of unused resources being calculated, when each of the type-1 masters makes an access request within the unit period, by subtracting an amount of resources used by each of the type-1 masters having made the access request from the maximum amount of resources determined for each of the type-1 masters having made the access request; and selecting, when one of the type-1 masters and the type-2 master make access requests within the unit period, the access request made by the type-2 master as the allowable access request if a total amount of unused resources managed by the management unit is equal to or larger than an amount of resources to be used by the type-2 master, and the access request made by the one of the type-1 masters as the allowable access request if the total amount of unused resources managed by the management unit is smaller than the amount of resources to be used by the type-2 master.

10. An integrated circuit for use in an access control apparatus that receives access requests from (i) one or more type-1 masters for each of which a maximum amount of resources used to access a memory within a unit period is preliminarily determined and (ii) a type-2 master different from the type-1 masters, and sequentially selects one of the access request as an allowable access request, the integrated circuit comprising:

a management unit operable to manage an amount of unused resources, the amount of unused resources being calculated, when each of the type-1 masters makes an access request within the unit period, by subtracting an amount of resources used by each of the type-1 masters having made the access request from the maximum amount of resources determined for each of the type-1 masters having made the access request; and a selection unit operable to, when one of the type-1 masters and the type-2 master make access requests within the unit period, select the access request made by the type-2 master as the allowable access request if a total amount of unused resources managed by the management unit is equal to or larger than an amount of resources to be used by the type-2 master, and select the access request made by the one type-1 masters as the allowable access request if the total amount of unused resources managed by the management unit is smaller than the amount of resources to be used by the type-2 master.

11. A digital television comprising the access control apparatus of claim 1.

12. A mobile apparatus comprising the access control apparatus of claim 1.

* * * * *